US006990496B1

(12) United States Patent
McGee, III et al.

(10) Patent No.: US 6,990,496 B1
(45) Date of Patent: Jan. 24, 2006

(54) SYSTEM AND METHOD FOR AUTOMATED CLASSIFICATION OF TEXT BY TIME SLICING

(75) Inventors: Thomas Francis McGee, III, Garrison, NY (US); Nevenka Dimitrova, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 328 days.

(21) Appl. No.: 09/616,631

(22) Filed: Jul. 26, 2000

(51) Int. Cl.
*G06F 17/00* (2006.01)

(52) U.S. Cl. .................. 707/101; 707/102; 707/104.1; 707/200

(58) Field of Classification Search ........ 707/200–205, 707/1–10, 100–104.1; 345/300, 301, 302; 715/500, 515, 516, 530–541
See application file for complete search history.

(56) References Cited

U.S. PATENT DOCUMENTS

| 5,168,565 | A |   | 12/1992 | Morita | 395/600 |
|---|---|---|---|---|---|
| 5,371,807 | A | * | 12/1994 | Register et al. | 382/159 |
| 5,463,773 | A |   | 10/1995 | Sakakibara et al. | 395/600 |
| 5,664,227 | A | * | 9/1997 | Mauldin et al. | 715/516 |
| 5,873,056 | A |   | 2/1999 | Liddy et al. | 704/9 |
| 6,137,911 | A | * | 10/2000 | Zhilyaev | 382/225 |
| 6,266,442 | B1 | * | 7/2001 | Laumeyer et al. | 382/190 |
| 6,295,092 | B1 | * | 9/2001 | Hullinger et al. | 348/468 |
| 6,363,380 | B1 | * | 3/2002 | Dimitrova | 707/6 |
| 6,597,738 | B1 | * | 7/2003 | Park et al. | 382/107 |
| 6,742,163 | B1 | * | 5/2004 | Ono et al. | 715/513 |
| 6,845,485 | B1 | * | 1/2005 | Shastri et al. | 715/530 |

FOREIGN PATENT DOCUMENTS

| EP | 0704810 A1 | 4/1996 |
|---|---|---|
| WO | WO9936863 | 7/1999 |

OTHER PUBLICATIONS

S. Takao et al (Segmentation and Classification of TV news articles based on speech dictation, Department of Electronics and Informatics, Ryukoku University, Sep. 15, 1999 IEEE).*

Takao et al: Segmentation and classification of TV news articles based on speech dictation: TENCON 99: Proceedings of the IEEE Region 10 Conference, Sep. 15, 1999, pp. 92-95.

* cited by examiner

*Primary Examiner*—Jean M. Corrielus
*Assistant Examiner*—Isaac M. Woo
(74) *Attorney, Agent, or Firm*—Larry Liberchuk (57) ABSTRACT

For use in an information processing system, there is disclosed a system and method for automatically classifying text. The system comprises a text classifier controller that reads text having one or more keywords contained within one or more story segments within the text. The text classifier controller identifies keywords within each line, and, in response to identifying at least one keyword within a line of text, classifies that line of text as a part of a story segment within the text. The text classifier controller also identifies keyword transition points in the text where the number of detected keywords in a particular category of keywords decreases below a threshold number. The text classifier controller also identifies keyword transition points in the text where the number of detected keywords in a particular category of keywords increases above a threshold number. The text classifier controller classifies story segments based on the location of the keyword transition points.

24 Claims, 4 Drawing Sheets

SYSTEM AND METHOD FOR AUTOMATED CLASSIFICATION OF TEXT BY TIME SLICING

TECHNICAL FIELD OF THE INVENTION

The present invention is directed, in general, to a system and method for the automated classification of text and, more specifically, to a system and method for the automated classification of the text of individual story segments that occur within video, audio and/or text broadcasts. Classification of the text of individual story segments may be used to categorize video segments so that the categorized video segments can bel selectively retrieved at later times.

BACKGROUND OF THE INVENTION

Computerized personal information retrieval systems exist for identifying and recording segments of radio or television broadcasts that contain topics that a user desires to record. The desired segments are usually identified based upon keywords input by the user. In a typical application, a computer system operates in the background to monitor the content of information from a source such as the Internet. The content selection is guided by the keywords provided by the user. When a match is found between the keywords and the content of the monitored information, the information is stored for later replay and viewing by the user. Although the downloaded information may include links to audio or video clips that can also be downloaded by the user, the selection of the information for storage is based primarily on the frequency at which the keywords provided by the user appear in the text of the broadcast materials.

A computerized personal information retrieval system that allows users to select and retrieve portions of radio or television programs for later playback usually meets three primary requirements. First, a system and method is usually available for parsing an incoming video signal into its visual, audio, and textual components. Second, a system and method is usually available for analyzing the content of the audio and/or textual components of the broadcast signal with respect to user input criteria and segmenting the components based upon content. Third, a system and method is usually available for integrating and storing program segments that match the user's requirements for later replay by the user.

A system that meets these requirements is described in U.S. patent application Ser. No. 09/006,657 filed Jan. 13, 1998 by Dimitrova (a co-inventor of the present invention) entitled "Multimedia Computer System with Story Segmentation Capability and Operating Program Therefor." U.S. patent application Ser. No. 09/006,657 is hereby incorporated by reference within this patent application for all purposes as if fully set forth herein.

U.S. patent application Ser. No. 09/006,657 describes a system and method that provides a set of models for recognizing a sequence of symbols, a matching model that identifies desired selection criterion, and a methodology for selecting and retrieving one or more video story segments or sequences based upon the selection criterion.

U.S. patent application Ser. No. 09/006,657 does not specifically address the problem that results when the methodology for segmenting the broadcast information into independent stories is primarily centered on visual content rather than video segmentation enhanced with audio and textual analysis. Currently, when video segmented stories are classified according to keywords, the analysis is based upon the assumption that the detection and required frequency of specified keywords in the segment provides an indication that the whole segment can be categorized by a single set of keywords. In actuality, there is a high probability that the frequency of appearance of specific keywords may change with time across a broadcast segment even when the video criteria for story segmentation are satisfied.

Therefore, video segmentation may result in one or more segments that have multiple stories within the section and that may be classified according to a single set of keywords. The resulting keywords that are selected to classify a segment with multiple stories may or may not be applicable to each story within the segment.

There is therefore a need in the art for an improved system and method for identifying and segmenting broadcast information. In particular, there is need in the art for an improved system and method for identifying and segmenting broadcast information according to keywords. More particularly, there is a need in the art for an improved system and method for automated classification of the text of individual story segments that occur within a broadcast text over a period of time.

SUMMARY OF THE INVENTION

To address the above-discussed deficiencies of the prior art, it is a primary object of the present invention to provide, for use in a multimedia broadcast system, an improved system and method for the automated classification of multimedia information according to audio and/or textual content over a period of time. Specifically, it is a primary object of the present invention to provide an improved system and method for categorizing video segments so that the video segments can be selectively retrieved at later times.

The system of the present invention comprises a text classifier controller that reads text having one or more keywords contained within one or more story segments within the text. The text classifier controller identifies keywords within each line, and, in response to identifying at least one keyword within a line of text, classifies that line of text as a part of a story segment within the text.

The text classifier controller identifies keyword transition points in the text where the number of detected keywords in a particular category of keywords decreases below a threshold number. The text classifier controller also identifies keyword transition points in the text where the number of detected keywords in a particular category of keywords increases above a threshold number. The text classifier controller classifies story segments based on the location of the keyword transition points.

It is an object of the present invention to provide an improved system and method for reading lines of text to identify keywords contained within the lines of text.

It is also an object of the present invention to provide an improved system and method for classifying each line of text in a category of keywords that has the largest number of keywords in the line of text.

It is another object of the present invention to provide an improved system and method for classifying story segments in a text by identifying and locating keyword transition points in the text.

It is an additional object of the present invention to provide an improved system and method for classifying a story segment in a text by identifying and locating two adjacent keyword transition points in the text.

It is also an object of the present invention to provide an improved system and method for classifying a story segment in a text when no keyword transition point is identified.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged multimedia information system.

Figure 1:
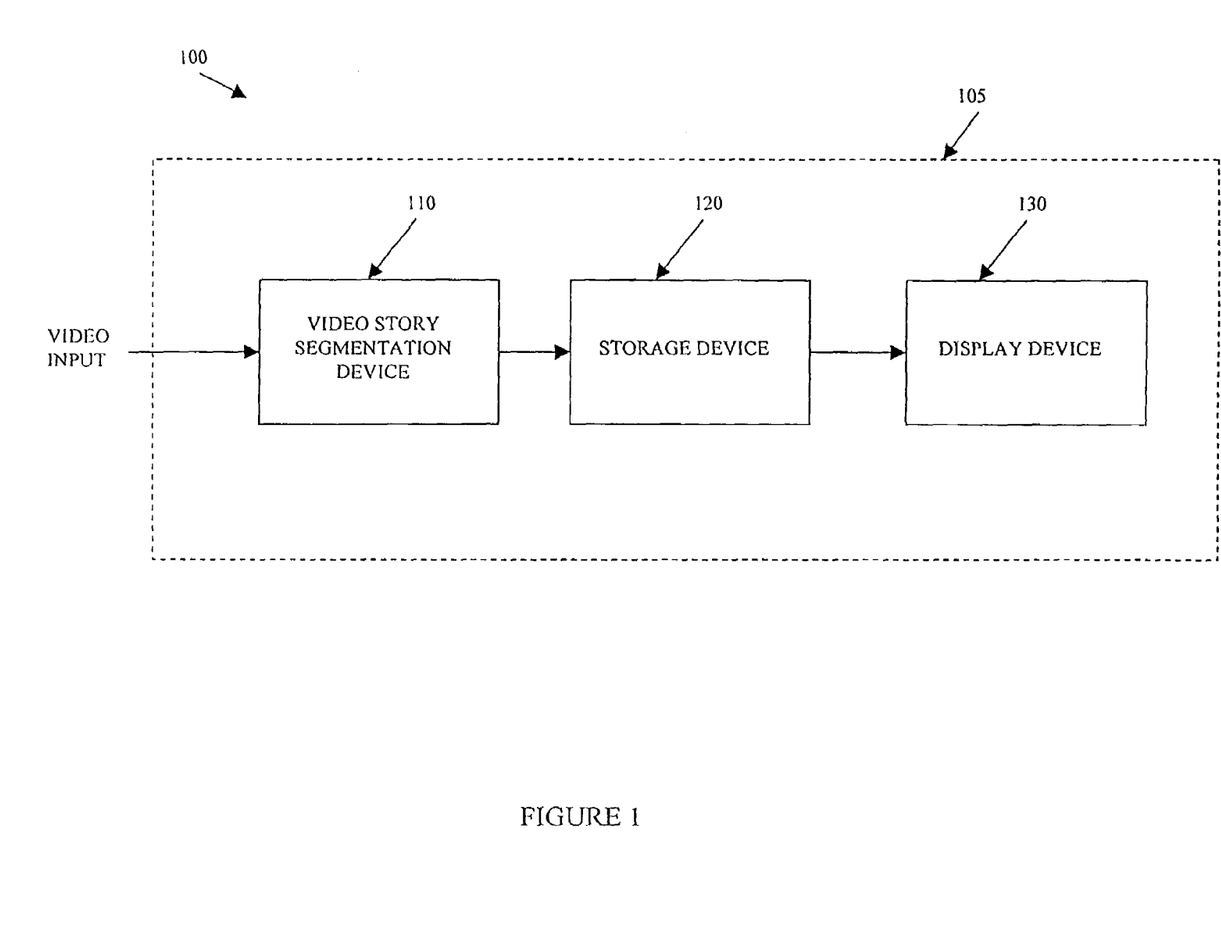
FIG. 1 illustrates a high level block diagram of an exemplary multimedia computer system, according to one embodiment of the present invention.

FIG. 1 illustrates a high level block diagram 100 of an exemplary multimedia computer system 105 according to one embodiment of the present invention. Multimedia computer system 105 comprises video story segmentation device 110, storage device 120 and display device 130. According to one embodiment, video story segmentation device 110 may be a television set top box, storage device 120 may be a video cassette recorder (VCR), and display device 130 may be a television set.

In another embodiment, multimedia computer system 105 may be a multimedia-capable computer processing unit (CPU) equipped with a television tuner card and a read-write compact disc (CD-RW) drive. For this embodiment, the CPU and the television tuner card collectively constitute video story segmentation device 110, the CD-RW drive constitutes storage device 120, and the computer display constitutes display device 130. In an alternate embodiment, one of a compact disc read-only-memory (CD-ROM) drive, a CD-RW drive, or a digital versatile disc (DVD) drive may provide the multimedia Video Input signal rather than a television broadcast or cable system. In another embodiment, the hard drive associated with the CPU may serve as storage device 120. Other configurations are also possible. For example, one embodiment may comprise a video story segmentation device 110 that is built into a video cassette recorder or a CD-RW drive.

The term "video" may be interchanged with "multimedia." In either case, the input signal comprises a=time sequence of simultaneous video shots, audio segments, and text segments (e.g., closed captioned text, speech-to-text conversion, extracted video text). The term "text" refers to a transcript of program materials. The term "text" may include, but is not limited to, transcripts of video text, transcripts of audio text, transcripts of closed captioned text, and generated transcripts of text.

The Video Input signal may include time markers. Alternatively, time markers may be inserted into the Video Input by video story segmentation device 110.

The term "multimedia signal" signifies a signal having a video component and at least one other component (e.g., an audio component). Multimedia signals may comprise video clips, video stream, video bitstream, video sequence, digital video signal, analog video signal, broadcast television signal, and similar signals, whether the signal is compressed or not. Although the following discussions refer to a multimedia signal which is a digital signal, the present invention is not restricted to digitized video or multimedia signals.

Figure 2:
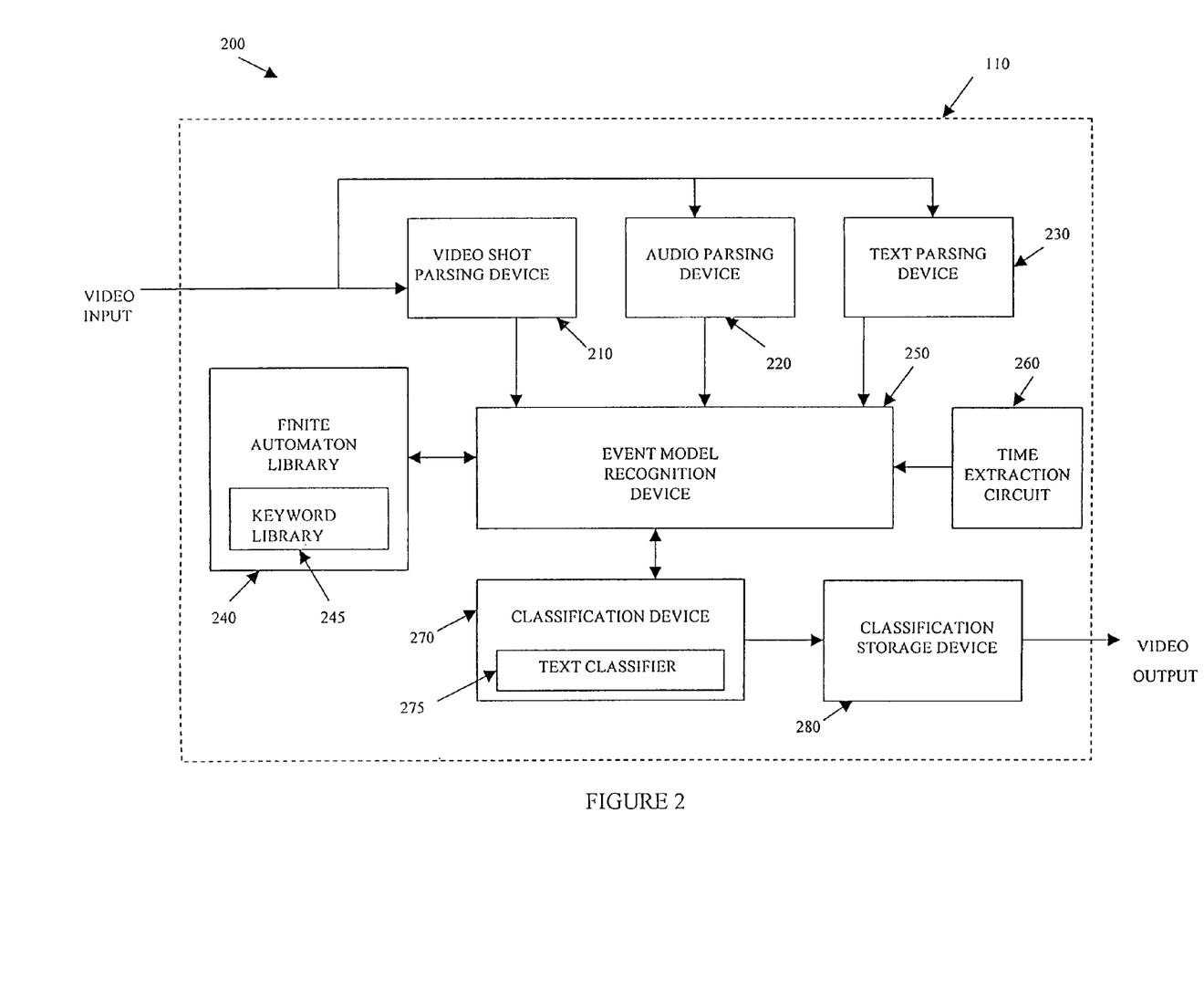
FIG. 2 illustrates a high level block diagram of an exemplary video segmentation device, according to one embodiment of the present invention.

FIG. 2 illustrates a block diagram 200 of exemplary video story segmentation device 110 in greater detail, according to one embodiment of the present invention. Video story segmentation device 110 comprises video shot parsing device 210, audio parsing device 220, text parsing device 230, time extraction circuit 260, finite automaton (FA) library 240 with keywords library 245, event model recognition device 250, classification device 270 with text classifier 275, and classification storage device 280.

FA library 240 and classification storage device 280 may be within a single memory device. The single memory device may be a non-volatile memory device such as a hard drive, flash memory, or programmable read-only memory (PROM). The devices included in video story segmentation device 110 may be software modules for transforming a general purpose computer into a multimedia computer system, where each of the modules resides in a program memory (i.e., a storage medium) until called by the system central processing unit (CPU). A detailed description of the various devices included in video story segmentation device 110 will now be provided in terms of the corresponding software modules.

Video shot parsing device 210, audio parsing device 220, and text parsing device 230 each function to separate their designated portion of the Video Input signal from the other components of the signal and to digitize these signals, as required, for transfer to the appropriate section of event model recognition device 250. In an advantageous embodiment, one of (or a combination of) video shot parsing device 210, audio parsing device 220, and text parsing device 230 may comprise a digital filter that is specifically configured for the frequency range of signals associated with the respective video, audio, or text based signals. Alternatively, one or more of video shot parsing device 230, audio parsing device 220, and text parsing device 210 may comprise software with algorithms for extracting the content of the associated Video Input signal component.

Video shot parsing device 210 detects video cuts to produce a sequence of key frames and time stamps for these key frames that are provided as an output to event model recognition device 250. Similarly, audio parsing device 220 emulates a speech recognition system that separates the extracted audio signal into discrete segment types, including voice, music, laughter, and silence. Audio parsing device 220 analyzes the extracted voice signals and detects and identifies speakers based upon this analysis. Audio parsing device 220 inserts time stamps into extracted and categorized audio data. Text parsing device 230 decodes the text associated with closed captioning and inserts time stamps with this text.

Time extraction circuit 260 provides a clock signal which is used as the timing source for all devices within video story segmentation device 110. Time extraction circuit 260 provides time stamps that are inserted with separated visual, audio, and text information. The time stamps are used to identify signals that are received at the same or sequential points in time.

Finite automaton (FA) library 240 provides storage for finite automaton event models that represent specific types of visual, audio, or text patterns for segmentation and labeling purposes. The concept of a finite automaton (FA) is similar to that used in compilers. The FA constructs models based on possible sequences of labels with a transition graph having nodes with arrows between the nodes that indicate allowable transitions from one node to another. Sequential processes are modeled by paths through the transition graph from node to node along the arrows. Each path corresponds to a sequence of labels of successive nodes along the path.

With respect to video signal story segmentation, each node of the FA represents an event with a symbolic label designating appropriate characteristics of the signal being analyzed. For example, FA library 240 may store labels representing a set of keyframes, a set of keywords, an audio feature designation for a time-interval, and similar characteristics of video, audio, and text data. In the selection of a path in the selection graph, each transition between nodes is based not only on the appearance of a particular label (symbol), but on a collection of symbols extracted from the Video Input signal that represent text, video frame, and audio segments. As a result of using the FA, the labels of the nodes along the transition path provide a descriptive FA model for segments of the Video Input signal.

FA library 240 may store FA data comprising symbols, nodes, and path information for pre-determined models that are representative of signal patterns within sequential visual, audio, and text signals. In addition, FA library 240 may provide storage for new FA data that may be created, for example, by event model recognition device 250 based upon characteristics of incoming data.

Keywords library 245 within FA library 240 provides storage for keywords that may be used as labels and for identifying keywords within text or digitized audio signals. Keyword library 245 may provide a pre-determined collection of keywords (default keywords) that are representative of types of dialogue, such as dialogue associated with news programs, that may be present in a representative cross-section of program segments that are monitored by a typical user. For example, keywords such as "murder", "theft", "gunshot", "criminal" and "police" may be indicative of a story about crime. Similarly, keywords such as "Senate", "House of Representatives", "Washington", "Senate bill", "House bill" and "legislation" may be indicative of a political news story. Keyword library 245 may also store keywords that are user selected.

Event model recognition device 250 synchronizes incoming video, audio, and text data from the respective video shot parsing device 210, audio parsing device 220, and text parsing device 230 according to time extraction circuit 260. Event model recognition device 250 then compares the synchronized incoming data with known models from FA library 240. When event model recognition device 250 cannot find an event model from FA library 240 that matches particular time stamped segments of the incoming signals, event model recognition device 250 creates an event model that conforms to the segment and labels and stores this model in FA library 240 for future use.

After event model recognition device 250 has matched the incoming signals with an associated FA, the label of the FA and the keywords describing the FA characteristics may be transferred to classification device 270 for story analysis. The label assigned to a new FA model may be assigned by the user, or may be generated by multimedia computer system 105 using electronic programming guide (EPG) information, or may be generated by multimedia computer system 105 using a random label generator.

Classification device 270 analyzes keyframes (frames without transitions) within the video shot with consideration to the determined FA characteristics. Using the FA characteristics and well known keyframe identification algorithms, classification device 270 identifies patterns within a video shot sequence for segmenting video signals into one or more groups of related sequences, where each related grouping is referred to as a story. Classification device 270 subsequently categorizes applicable video shots according to characteristic patterns associated with dialogue, news programming, sports, nature shots, and similar patterns.

Classification device 270 applies reiterative processes in which neighboring video shots are compared with the present keyframes to determine the presence of similar patterns (e.g., FAs). During this latter processing or at some later time, classification device 270 may retrieve textual information (e.g., closed captioning) or audio information converted to text for additional comparison and segmentation purposes. Through the iterative comparison process, classification device 270 eventually assembles a sequence of key frames with audio and text that are associated as a related video segment (i.e., a story).

During initial classification or prior to storage, classification device 270 may further refine story segmentation of particular classes of stories. According to one embodiment of the present invention, classification device 270 may route stories with a news classification, for example, to exemplary text classifier 275 for further analysis.

Text classifier 275 comprises software that examines a story segment to identify and classify portions of the story segment according to keywords. Video story segmentation device 110 with text classifier 275 comprises a text classifier controller that is capable of carrying out the present invention.

Text classifier 275 examines a story segment to identify and classify portions of the story segment according to keywords. As previously described, each story segment is received from classification device 270 with an indication of the keywords that have been determined to provide a classification of the subject categories within the story segment. Text classifier 275 receives the identified keywords and scans each line of story text for the keywords. Text classifier 275 calculates the frequency of occurrence of each keyword in each line of text. Text classifier 275 then classifies each line of text based on the frequency of occurrence of the detected keywords.

Text classifier 275 records statistical data on the frequency of occurrence of the keywords with respect to the number and location of the text lines in the story segment. Text classifier 275 applies a search algorithm to the recorded statistics in order to detect possible keyword transition points where the frequency of occurrence of the keywords in the text significantly changes.

For example, text classifier 275 determines that lines one through six in a story segment are classified in a crime story category. Line one through line six each contain at least one keyword from the crime story category. Text classifier 275 also determines that lines seven through fifteen are classified in a sports story category. Line seven through line fifteen each contain at least one keyword from the sports story category but contain no keywords from the crime story category. Text classifier 275 identifies a significant change in the keyword categories at a "keyword transition point" between line six and line seven.

A "keyword transition point" is a point between two adjacent portions of text where the frequency of appearance of keywords detected in a keyword category for each line of text prior to the keyword transition point decreases significantly or decreases below a threshold number. A "keyword transition point" may also be a point between two adjacent portions of text where the frequency of appearance of keywords detected in a keyword category for each line of text prior to the keyword transition point increases significantly or increases above a threshold number. A threshold number may be chosen to be any integer and may be chosen to be as low as the integer one.

In most instances a keyword transition point will mark a boundary where one story ends and another story begins. That is, when the number of keywords detected in a first keyword category for each line of text prior to a keyword transition point decreases below a first threshold number, then usually the number of keywords detected in a second keyword category for each line of text is increasing above a second threshold number for the second category. The decrease in the number of keywords in the first keyword category represents the end of a first story. The increase in the number of keywords in the second keyword category represents the beginning of a second story.

In some cases text classifier 275 will find a keyword transition point where there is a decrease in the number of keywords in a first keyword category but no increase in the number of keywords in any of the other possible keyword categories. Text classifier 275 then marks the keyword transition point as the end of the first story. The text after the keyword transition point is temporarily classified as "miscellaneous text" until text classifier 275 obtains sufficient additional information to determine an appropriate category for the miscellaneous text.

A successive line threshold number may be used to minimize the likelihood of an erroneous determination of a keyword transition point. For example, assume that text classifier 275 finds five successive lines that have keywords that are classified as belonging to a sport category. Then the sixth line has a keyword that is classified as belonging to a crime category. Then the next five lines have keywords that are classified as belonging to the sports category. The likelihood is that some crime keyword was used in the sports story. For example, the sportswriter may have said that "The referee's decision robbed the team of victory." The use of the crime keyword "robbed" in the sports story caused the line in which it appeared to be classified as a line of a crime story.

In this case, setting the successive line threshold number to at least two would mean that there would have to be at least two successive lines having a keyword that is classified as belonging to a crime category before text classifier 275 would consider the possibility that a keyword transition point exists between the sports story portion and the crime story portion of the text.

According to one embodiment, if the frequency of occurrence of keywords associated with the story classification is stable or rising, text classifier 275 categorizes that portion of the text as being appropriately classified by the detected keywords.

However, when text classifier 275 detects a keyword transition point where the number of detected keywords decreases below a threshold number, text classifier 275 may identify the keyword transition point as the possible end of one story and the possible beginning of another story. Text classifier 275 then identifies a possible new story segment beginning with the possible keyword transition point through the end of the original story segment. The story segment from the possible keyword transition point through the end of the original story segment is referred to as a partial story segment.

Text classifier 275 examines the partial story segment according to the frequency of occurrence of the keywords. According to an advantageous embodiment, if text classifier 275 finds an insufficient number of keywords to satisfy a minimum threshold number, text classifier 275 may determine 1) that the partial story segment is a transition segment from the original story, and 2) depending on the lines that follow the partial story segment may or may not determine that the partial story segment is to remain a part of the original story.

According to another advantageous embodiment, text classifier 275 may determine that the partial story segment also has a keyword transition point where the number of detected keywords associated with the current portion of the partial story segment decreases below a threshold number. Text classifier 275 may then classify the current portion of the partial story segment as a second story. Text classifier 275 then identifies another possible new story segment beginning with the keyword transition point through the end of the original story segment.

According to another advantageous embodiment, text classifier 275 may determine that the partial story segment also has a keyword transition point where the number of detected keywords not associated with the current portion of the partial story segment increases above a threshold number. Text classifier 275 may then classify the current portion of the partial story segment as a second story. Text classifier 275 then identifies another possible new story segment beginning with the keyword transition point through the end of the original story segment.

After text classifier 275 completes the examination of the original story segment with respect to one or more categories of keyword classifications and finds no additional keyword transition points, text classifier 275 examines the results of the keyword analysis and the elapsed time between keyword classification determinations to make a final determination of the number of individual stories within the original story segment. Text classifier 275 groups the new story segments, if any, according to keyword classification. Text classifier 275 then begins processing the next received story segment using the same procedure.

In an advantageous embodiment, text classifier 275 may apply a keyword algorithm that identifies the end of one story and the beginning of another story as the last text line that has an occurrence of the indicated keyword. In another embodiment, text classifier 275 may apply algorithms to further analyze story segments based upon the time duration of a particular classified segment. Within selected time thresholds, text classifier 275 may then classify a particular segment as being an advertisement, a public announcement, a teaser for an upcoming news story, or a similar type of story with a particular elapsed time interval.

Classification storage device 280 stores classified video segments from classification device 270 for immediate or delayed transfer to storage device 120 and eventual display by display device 130, as specified by the user.

Figure 3:
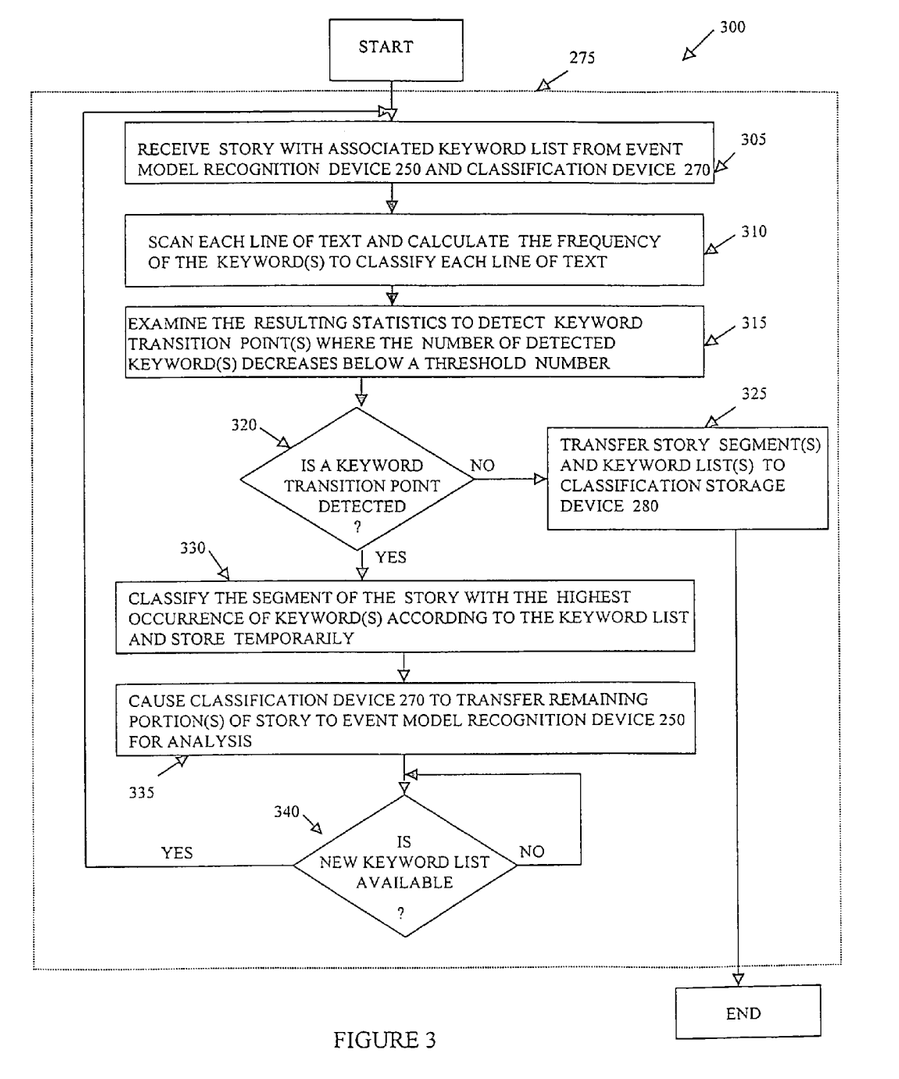
FIG. 3 illustrates a flow chart depicting the operation of an exemplary text classifier, according to one embodiment of the present invention.

FIG. 3 illustrates flow chart 300 depicting the operation of text classifier 275, according to one embodiment of the present invention. During the operation of video story segmentation device 110, text classifier 275 receives a classified story and its associated keyword list from event model recognition device 250 and classification device 270 (process step 305). Text classifier 275 then scans each line of text in the story for the keyword(s) that are included within the keyword list. Text classifier 275 then applies an algorithm (illustrated in FIG. 4) to determine the frequency of occurrence of the keyword(s) for each line of text. This algorithm will be described more fully below. The algorithm classifies each line of text within the particular story based upon the number of keyword(s) found in each individual line of text (process step 310).

Text classifier 275 then examines the keyword statistics that result from the scanning process to detect one or more keyword transition points in the story. As previously mentioned, a keyword transition point is a point where the frequency of appearance of keyword(s) from the keyword list decreases significantly or decreases below a threshold number (process step 315).

If at least one keyword transition point is detected in the story (process step 320), text classifier 275 classifies the portion of the story segment with the most frequent occurrence of keywords from the keyword list according to the category of the keyword list and temporarily stores the classified story segment (process step 330).

After text classifier 275 classifies and temporarily stores a first portion of the story (process step 330), text classifier 275 causes classification device 270 to transfer the remaining portion(s) of the original story to event model recognition device 250 for determination of a new keyword list that characterizes the remaining story portion(s) as one story (process step 335).

Text classifier 275 monitors the status of event model recognition device 250 until a keyword list is available for the remaining story portion(s) (process step 340). Text classifier 275 then starts the text classification process over again and receives the story portion(s) with associated keyword list from event model recognition device 250 and classification device 270, as previously described (process step 305).

The described process continues until text classifier 275 detects no keyword transition points within the story segment being classified (at which point text classifier 275 has detected the end of the text) (process step 320). When no keyword transition point is detected (and the end of the text has been detected) (process step 320), text classifier 275 combines the story portion being processed and its keyword list with any other story portion(s) and their keyword list(s) to create an integrated story and keyword list. Text classifier 275 then transfers the resultant story portion(s) and keyword list(s) to classification storage device 280 (process step 325). Video segmentation device 110 then continues its normal operation.

Figure 4:
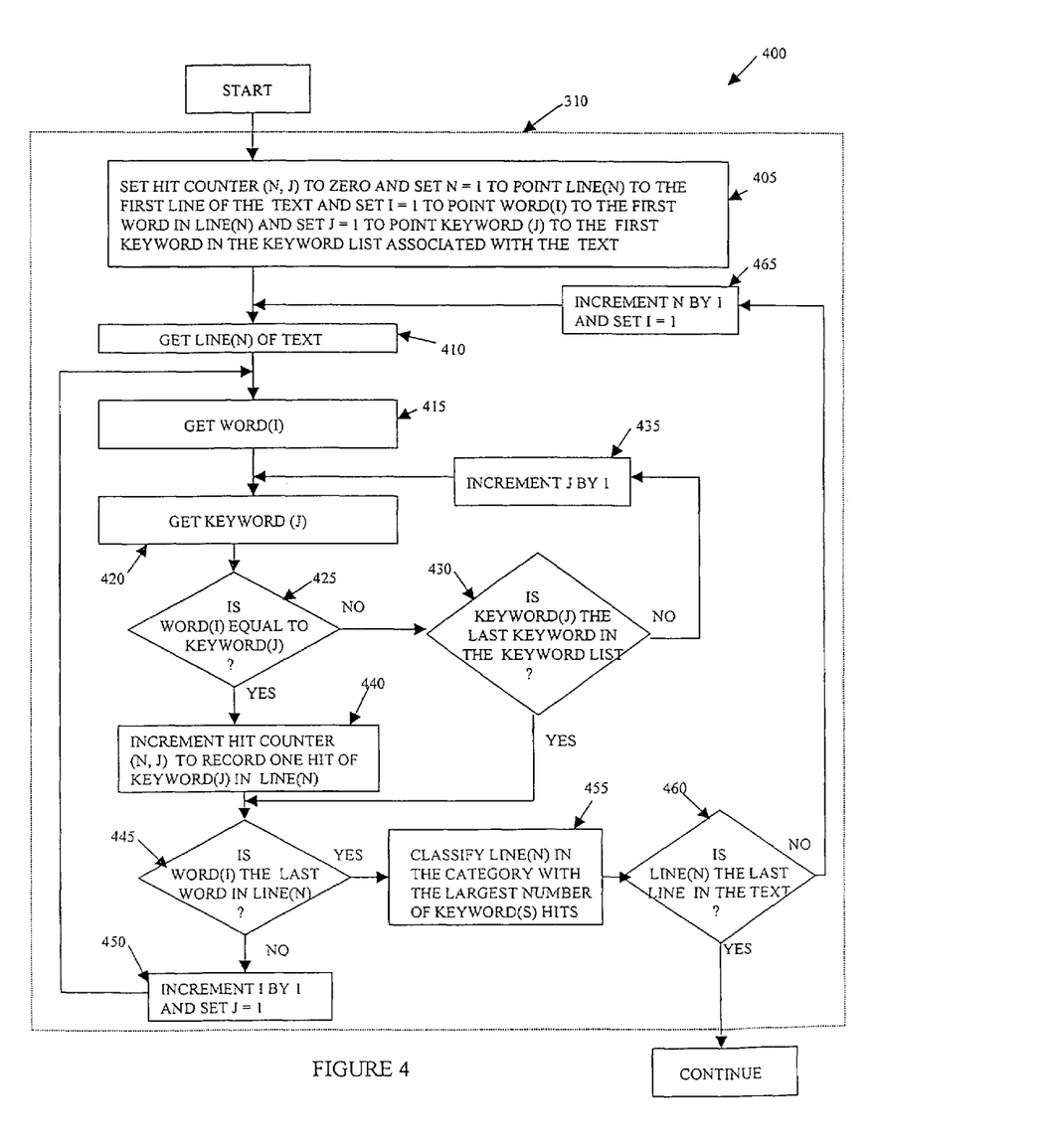
FIG. 4 illustrates a flow chart depicting the logical steps of an algorithm of the present invention for scanning each line of text in a textual segment to calculate the frequency of keywords within the line of text.

FIG. 4 illustrates flow chart 400 depicting the operation of an algorithm for scanning each line of text as described in process step 310. An array of computer memory locations having dimensions N by J is prepared to receive information concerning the identity and location of keywords that are detected in the text. The name of the N by J array is Hit Counter (N,J). The letter N denotes the number of a line of text. The letter J denotes the number of a keyword in the list of keywords. At the beginning of the algorithm each memory location in Hit Counter (N,J) is set equal to zero (process step 405).

An array of computer memory locations having dimensions N by M is prepared to receive N lines of text where each line of text is no longer than M characters. N is an integer index that sequentially points to each line in the text. The name of the variable that points to one line of text is Line (N). When N equals one (N=1), then Line (N) points to the first line in the text. When N equals two (N=2), then Line (N) points to the second line in the text, and so on.

In each Line (N) of text the individual words in Line (N) are sequentially identified as Word (I). I is an integer index that sequentially points to each word in Line (N) of text. That is, when 1 equals one (I=1), then Word (I) points to the first word in Line (N). When 1 equals two (I=2), then Word (I) points to the second word in Line (N), and so on.

An array of computer memory locations having dimensions J by K is prepared to receive J keywords where each keyword in the array is no longer than K characters. The keyword list resides in the J by K array of computer memory locations. J is an integer index that sequentially points to each keyword in the keyword list. The name of the variable that points to one keyword is Keyword (J). When J equals one (J=1), then Keyword (I) points to the first keyword in the keyword list, and so on.

The number N is set equal to one (1) to cause Line (N) to point the first line of text (process step 405). The number I is set equal to one (1) to cause Word (I) to point to the first word in Line (N) (process step 405). The number J is set equal to one (1) to cause Keyword (J) to point to the first keyword in the keyword list (process step 405).

The text in Line (N) is then retrieved into computer memory (process step 410). The first word Word (I) in Line (N) is then retrieved into computer memory (process step 415). Keyword (J) is then retrieved into computer memory (process step 420). A determination is then made as to whether Word (I) is equal to Keyword (J) (decision step 425).

If Word (I) is not equal to Keyword (J), then a determination is made as to whether Keyword (J) is the last keyword in the keyword list (decision step 430). If Keyword (J) is not the last keyword in the keyword list, then the integer value of J is incremented by one to point Keyword (J) to the next keyword in the keyword list (process step 435). The next keyword in the keyword list is retrieved into computer memory (process step 420). Control then passes to decision step 425 for further processing.

When decision step 425 finds that Word (I) equals Keyword (J), then the appropriate array location in Hit Counter (N, J) is incremented to record one "hit" of Keyword (J) in Line (N) (process step 450). Control then passes to decision step 445 to determine whether Word (I) is the last word in Line (N). Control also passes to decision step 445 from decision step 430 when it is determined that a particular Keyword (J) is the last keyword in the keyword list.

If Word (I) is not the last word of Line (N), then the integer value I is incremented by one to point Word (I) to the next word in Line (N) (process step 450). In addition, J is set equal to one to point Keyword (J) to the first keyword in the keyword list (process step 450). Control then passes to process step 415 to get the next Word (I) of Line (N) for further processing.

If Word (I) is the last word of Line (N), then Line (N) is classified in the category that has the largest number of keyword detections (or "hits") in Hit Counter (N,J) (process step 455). A determination is then made as to whether Line (N) is the last line in the text (decision step 460). If Line (N) is the last line in the text, then the algorithm described in flow chart 400 ends and control of the program passes to process step 315. If Line (N) is not the last line in the text, then the integer value N is incremented by one to point Line (N) to the next line of text (process step 470). In addition, I is set equal to one to point Word (I) to the first word in Line (N) (process step 465). Control then passes to process step 410 to get the next Line (N) of text for further processing.

Although selected keywords are often found to occur in the most recent portion of a story segment, this may not always be the case. It is possible that an original story segment may be classified according to keywords that appear in the latter portion, in the middle portion, or in some other portion of the story segment. It should be understood that text classifier 275 comprises algorithms that are capable of identifying and isolating stories within the original segment, regardless of the location of the stories within the original segment. It should be further understood that text classifier 275 in association with video story segmentation device 110 is capable of isolating remaining stories within the original story segment regardless of the time interval in which the remaining stories appear.

In an alternate embodiment, text classifier 275 may be used in conjunction with the initial video and audio classification algorithms. In this alternate embodiment, text classifier 275, working in conjunction with other portions of classification device 270, may classify segments as they occur according to the keyword algorithms that classify stories based upon the frequency of appearance of keywords over a period of time or within lines of text. In this alternate embodiment, text classifier 275 may also re-examine adjacent story segments to determine the possible presence of text lines which may be associated with the segment being presently classified.

In an alternate embodiment, FA library 240 and event model recognition device 250 may work within video story segmentation device 110 to separate and identify story segments based only on the characteristics of the audio and video components of the Video Input signal (as opposed to also using the text components of the Video Input signal). The audio components may be converted to text to separate and identify story segments but the text that comes directly from text parsing device 230 (e.g., closed captioned text, speech-to-text conversion, extracted video text) is not used to separate and identify story segments.

Classification device 270 receives each resultant story segment with its associated text. The associated text may include text converted from audio and text directly from text parsing device 230. Text classifier 275 then further segments the story segment based upon keywords from keyword library 245. Text classifier 275 performs a line by line analysis as illustrated in FIG. 4. When each line of text is classified, text classifier 275 detects keyword transition points and classifies portions of the story segment based upon the resultant keyword list for the particular segment. Text classifier 275 then transfers the resultant story segment(s) and associated keyword list(s) to classification storage device 280.

Although the present invention has been described in detail, those skilled in the art should understand that they can make various changes, substitutions and alterations herein without departing from the spirit and scope of the invention in its broadest form.

What is claimed is:

1. For use in an information processing system, an apparatus for automatically classifying video signals comprising:
    a processor
    a keyframe classifier for segmenting the video signals into an initial set of one or more story segments; and
    a text classifier controller adapted for:
        providing multiple classifications of text, said text classifier controller reading text having a plurality of keywords contained within at least one of the story segments,
        identifying one or more keywords within each of two or more lines of said text,
        in response to identifying at least one of said keywords, classifying each of said lines of text as a part of one or more classifications of said video signals that have been segmented into said at least one story segment, and
        in response to a comparison of said identified keywords, identifying a keyword transition point within said at least one story segment between two adjacent portions of text, wherein a number of keywords detected in a keyword category for at least one line of text prior to the keyword transition point either decreases below a first threshold number or increases above a second threshold number.

2. The apparatus as set forth in claim 1 wherein said text classifier controller is adapted for sequentially comparing first and second lines of text to compare the number of keywords detected for each first line of text with the number of keywords detected for each second line of text.

3. The apparatus as set forth in claim 2 wherein said text classifier controller is adapted for classifying text between a beginning of the text and the keyword transition point as one story segment of the text when said text classifier controller identifies the keyword transition point.

4. The apparatus as set forth in claim 2 wherein said text classifier controller is adapted for classifying text between the keyword transition point and a second keyword transition point as one story segment of the text when said text classifier controller identifies the keyword transition point and the second keyword transition point.

5. The apparatus as set forth in claim 1 wherein said text classifier controller comprises an algorithm for reading lines of text to identify keywords contained within said lines of text, wherein said algorithm classifies each line of text in a keyword category that has the largest number of keywords in said line of text.

6. The apparatus as set forth in claim 1, wherein one or more of the keywords are located in a number of successive lines of text prior to the keyword transition, the number of successive lines of text exceeding a third threshold number.

7. An information processing system of the type comprising:
   a video story segmentation device;
   a keyword library; and
   a classification device;
   wherein said information processing system includes a text classifier controller adapted for:
      reading text having a plurality of keywords contained within at least one story segment within said text,
      identifying one or more keywords within each of two or more lines of said text,
      in response to identifying at least one of said keywords, classifying each of said lines of text as a part of said at least one story segment into one or more classifications of said at least one story segment within said text, and
      in response to a comparison of said identified keywords, identifying a keyword transition point within said at least one story segment between two adjacent portions of text, wherein a number of keywords detected in a keyword category for at least one line of text prior to the keyword transition point either decreases below a first threshold number or increases above a second threshold number.

8. The information processing system as set forth in claim 7 wherein said text classifier controller is adapted for sequentially comparing first and second lines of text to compare the number of keywords detected for each first line of text with the number of keywords detected for each second line of text.

9. The information processing system as set forth in claim 8 wherein said text classifier controller is adapted for classifying text between a beginning of the text and the keyword transition point as one story segment of the text when said text classifier controller identifies the keyword transition point.

10. The information processing system as set forth in claim 8 wherein said text classifier controller is adapted for classifying text between the keyword transition point and a second keyword transition point as one story segment of the text when said text classifier controller identifies the keyword transition point and the second keyword transition point.

11. The information processing system as set forth in claim 7 wherein said text classifier controller comprises an algorithm for reading lines of text to identify keywords contained within said lines of text, wherein said algorithm classifies each line of text in a keyword category that has the largest number of keywords in said line of text.

12. The information processing system as set forth in claim 7, wherein one or more of the keywords are located in a number of successive lines of text prior to the keyword transition, the number of successive lines of text exceeding a third threshold number.

13. For use in an information processing system, a computer-implemented method of automatically classifying audio and visual signals comprising the steps of:
   initially segmenting the audio and visual signals based upon keyframe identification into one or more story segments;
   reading text having a plurality of keywords contained within at least one story segment;
   identifying one or more keywords within each of two or more lines of said text;
   in response to identifying at least one of said keywords, classifying each of said lines of text as a part of one or more classifications of said audio and visual signals that have been segmented into said at least one story segment; and
   in response to a comparison of said identified keywords, identifying a keyword transition point within said at least one story segment between two adjacent portions of text, wherein a number of keywords detected in a keyword category for at least one line of text prior to the keyword transition point either decreases below a first threshold number or increases above a second threshold number.

14. The computer-implemented method as set forth in claim 13 further comprising the step of:
   sequentially comparing first and second lines of text to compare the number of keywords detected for each first line of text with the number of keywords detected for each second line of text.

15. The computer-implemented method as set forth in claim 14 further comprising the step of:
   classifying text between a beginning of the text and the keyword transition point as one story segment of the text when said text classifier controller identifies the keyword transition point.

16. The computer-implemented method as set forth in claim 14 further comprising the step of:
   classifying text between the keyword transition point and a second keyword transition point as one story segment of the text when said text classifier controller identifies the keyword transition point and the second keyword transition point.

17. The computer-implemented method as set forth in claim 13 further comprising the steps of:
   sequentially comparing first and second lines of text to compare the number of keywords detected for each first line of text with the number of keywords detected for each second line of text;
   identifying a plurality of keyword transition points in said text between adjacent portions of text; and
   classifying the text between each two adjacent keyword transition points of said plurality of keyword transition points as a story segment of the text.

18. The computer-implemented method as set forth in claim 13, wherein one or more of the keywords are located in a number of successive lines of text prior to the keyword transition, the number of successive lines of text exceeding a third threshold number.

19. For use in a computerized information processing system, computer-executable instructions stored on a computer-readable storage medium for automatically classifying text, the computer-executable instructions comprising the steps of:

initially segmenting a video into one or more story segments based upon keyframes;

reading text having a plurality of keywords contained within at least one story segment;

identifying one or more keywords within each of two or more lines of said text;

in response to identifying at least one of said keywords, classifying each of said lines of text as a part of one or more classifications of said video that have been segmented into said at least one story segment; and in response to a comparison of said identified keywords, identifying a keyword transition point within said at least one story segment between two adjacent portions of text, wherein a number of keywords detected in a keyword category for at least one line of text prior to the keyword transition point either decreases below a first threshold number or increases above a second threshold number.

20. The computer-executable instructions stored on a computer-readable storage medium as set forth in claim 19, the computer-executable instructions further comprising the step of:

sequentially comparing first and second lines of text to compare the number of keywords detected for each first line of text with the number of keywords detected for each second line of text.

21. The computer-executable instructions stored on a computer-readable storage medium as set forth in claim 20, the computer-executable instructions further comprising the step of:

classifying text between a beginning of the text and the keyword transition point as one story segment of the text when said text classifier controller identifies the keyword transition point.

22. The computer-executable instructions stored on a computer-readable storage medium as set forth in claim 20, the computer-executable instructions further comprising the step of:

classifying text between the keyword transition point and a second keyword transition point as one story segment of the text when said text classifier controller identifies the keyword transition point and the second keyword transition point.

23. The computer-executable instructions stored on a computer-readable storage medium as set forth in claim 19, the computer-executable instructions further comprising the steps of:

sequentially comparing first and second lines of text to compare the number of keywords detected for each first line of text with the number of keywords detected for each second line of text;

identifying a plurality of keyword transition points in said text between adjacent portions of text; and classifying the text between each two adjacent keyword transition points of said plurality of keyword transition points as a story segment of the text.

24. The computer-executable instructions stored on a computer-readable storage medium as set forth in claim 19, wherein one or more of the keywords are located in a number of successive lines of text prior to the keyword transition, the number of successive lines of text exceeding a third threshold number.

* * * * *